UNITED STATES PATENT OFFICE.

GROVENOR A. CURTICE, OF HOPKINTON, NEW HAMPSHIRE.

MIXTURE FOR PRESERVING EGGS.

SPECIFICATION forming part of Letters Patent No. 274,283, dated March 20, 1883.

Application filed December 16, 1882. (No specimens.)

*To all whom it may concern:*

Be it known that I, GROVENOR A. CURTICE, of Hopkinton, in the county of Merrimac, State of New Hampshire, have invented a certain new and useful Improvement in Compounds for Preserving Eggs, of which the following is a description sufficiently full, clear, and exact to enable any person skilled in the art or science to which said invention appertains to make and use the same.

This invention consists of a composition for preserving eggs, composed of cream of lime, chloride of sodium, nitrate of potash, carbonate of magnesia, glycerine, and water, mixed in the proportions hereinafter set forth.

The following is the formula which I employ: Cream of lime, one gill; chloride of sodium, two ounces; nitrate of potash, half-ounce; carbonate of magnesia, one ounce; glycerine, four ounces; water, one gallon.

The above ingredients are to be thoroughly mixed, and used by immersing the eggs in the compound in any proper and convenient vessel adapted for that purpose, which should be kept in a cellar or cool room until the eggs are required for use. The glycerine readily combines with the water, and, having strong capillary properties, penetrates the pores of the shells and assists in depositing the other ingredients therein. I have also found that the glycerine in this connection possesses strong preservative qualities in itself and aids materially in holding the other ingredients in solution, or in preventing precipitation. It also, to a large extent, excludes the air and prevents evaporation of the water, thereby rendering it unnecessary to replenish the same as frequently as is required in ordinary compounds of this character.

I do not confine myself strictly to the proportions given, as these may be varied somewhat without materially changing the nature of the preparation.

I am aware that a composition for preserving eggs has been suggested consisting of a solution of lime, glycerine, soluble alkaline carbonates, and small quantities of boracic, nitric, and oxalic acids, said carbonates being in such quantities as to form free caustic alkali when mixed with the lime; but in my invention an insoluble carbonate is used in forming the composition, the acids are omitted, and the desired result is obtained at much less expense.

Having thus explained my improvement, what I claim is—

The herein-described composition of matter to be used for preserving eggs, consisting of lime, chloride of sodium, nitrate of potash, carbonate of magnesia, glycerine, and water, in the proportions substantially as specified.

GROVENOR A. CURTICE.

Witnesses:
C. A. SHAW,
H. E. METCALF.